Inventor:
AUGUST EMANUEL TILLANDER

Mar. 13, 1923. 1,448,043.
A. E. TILLANDER.
SPEED INDICATOR FOR AUTOMOBILES AND THE LIKE.
FILED APR. 11, 1921. 2 SHEETS—SHEET 2.

Inventor:
AUGUST EMANUEL TILLANDER
By George Bayard Jones, Atty.

Patented Mar. 13, 1923.

1,448,043

UNITED STATES PATENT OFFICE.

AUGUST EMANUEL TILLANDER, OF STOCKSUND, SWEDEN, ASSIGNOR TO GUSTAF ERNFRID SYLVEN, OF STOCKHOLM, SWEDEN.

SPEED INDICATOR FOR AUTOMOBILES AND THE LIKE.

Application filed April 11, 1921. Serial No. 460,373.

*To all whom it may concern:*

Be it known that I, AUGUST EMANUEL TILLANDER, a subject of the King of Sweden, residing at Stocksund, in the Kingdom of Sweden, have invented a new and useful Improvement in Speed Indicators for Automobiles and the like, of which the following is a specification.

The present invention relates to an improvement in speed indicators for automobiles, motor cycles, and similar vehicles which are driven by means of internal combustion engines having electric ignition. The object of the invention is to prevent such vehicles from being driven faster than at the permitted speed, and the invention is principally characterized by this that a contact means is connected in the ignition circuit of the motor, said means being connected with the speed indicator in such manner that when the speed of the automobile or the like exceeds a certain limit the contact means breaks or short-circuits the ignition current so that the engine is caused to stop. By sealing said contact means in suitable manner it is thus possible to prevent the driver from starting his vehicle again without breaking the seal.

The permitted maximum speed is often different in different places, for instance in cities and in the country, or at different times of the day and night. For the purpose of rendering the present improvement serviceable also in such cases when the permitted maximum speed varies, the invention also comprises the arrangement that the contact means connected in the ignition circuit of the engine is made adjustable in relation to the member of the speed indicator actuating said means, in such manner that when adjusted in different positions said means is put into operation by the speed indicator at different attained speeds which may thus correspond to the different permitted maximum speeds. In order that it shall be possible to control whether the driver has actually adjusted the contact means to correspond to the permitted maximum speeds it is suitable to provide the contact means with a pen point which traces a diagram on a drum or roller driven for instance from one wheel of the automobile and thus indicates the speeds for which the contact means has been set.

Figure 1:
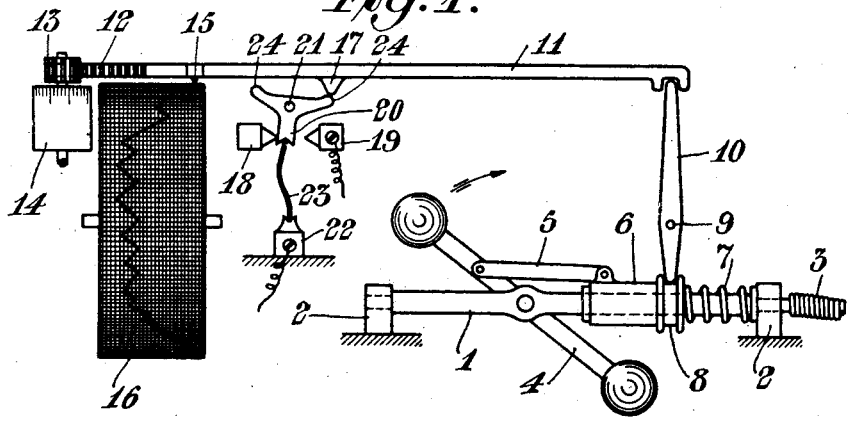
Figure 2:
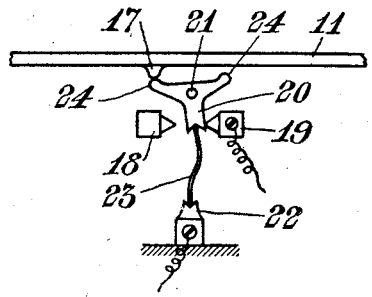
Figure 3:
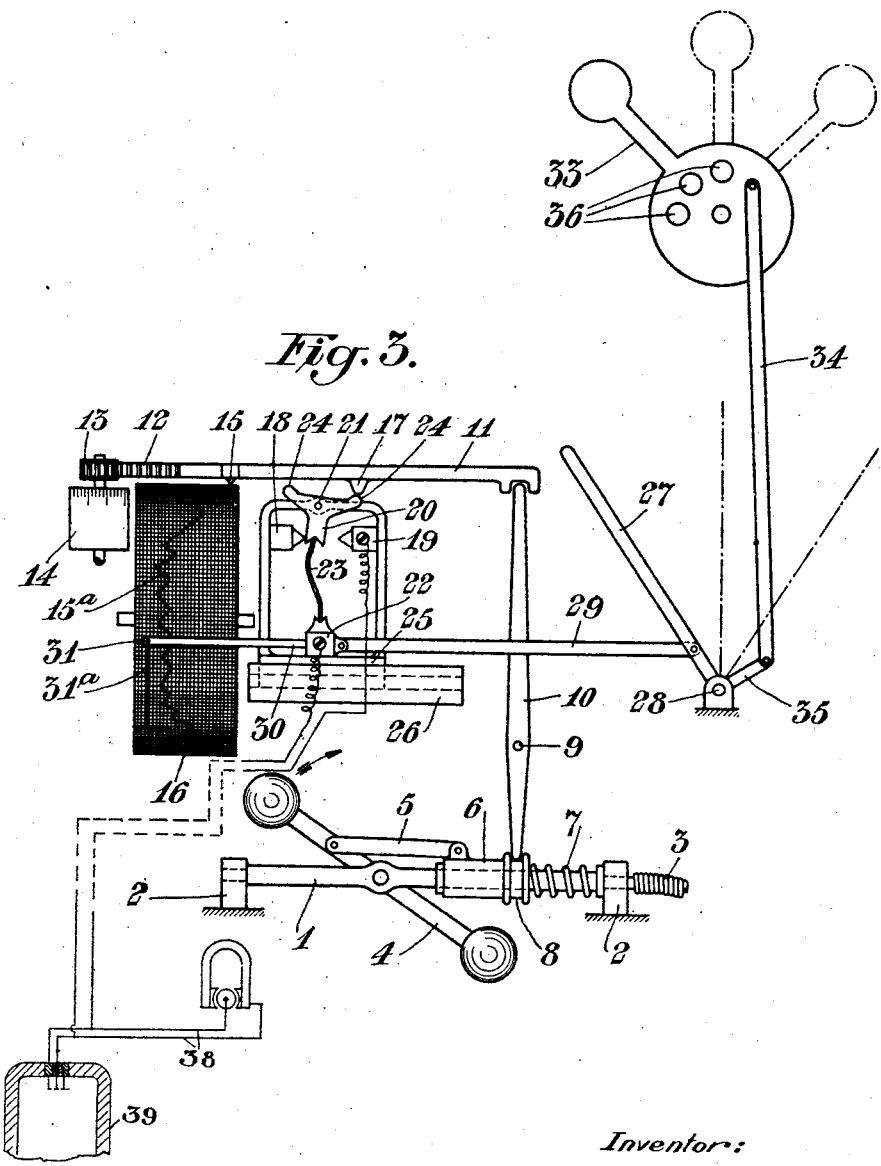

In the accompanying drawings two embodiments of the present invention are illustrated by way of example. Fig. 1 illustrates diagrammatically a speed indicator, for instance for an automobile, provided with a contact means according to the invention, and Fig. 2 is a detail showing said contact means in another position. Fig. 3 illustrates diagrammatically a further embodiment of the invention.

In the embodiment illustrated in Figs. 1 and 2 1 denotes a shaft journalled in two stationary bearings 2, said shaft being adapted to be driven by means of a flexible shaft 3, for instance from one wheel of the automobile, with a speed corresponding to that of the automobile. A pendulum rod 4 is pivoted to the shaft 3 and is connected by means of a link 5 with a sleeve 6 sliding on the shaft 1, said sleeve 6 tending to move to the left in Fig. 1 under the action of a coil spring 7. An annular groove 8 in the sleeve 6 is engaged by one arm of a lever 10 fulcrumed at 9, the other arm of said lever being hinged to a longitudinally movable rod 11. The other end of said rod is formed as a toothed rack 12 meshing with a toothed pinion 13 secured to the shaft of a drum 14 which is graduated and indicates the speed of the automobile at every moment in the ordinary manner. There is also secured to the rod 11 a pen point 15 which traces a speed diagram on a second drum 16 which is surrounded by square-ruled paper and is driven from the shaft 1.

According to the invention a lug 17 is provided on the rod 11, and is adapted to actuate the contact means which, in the embodiment illustrated, consists of a T-shaped contact arm 20 pivoted on the fulcrum 21 so as to be movable between two stationary contacts 18 and 19. A spring 23 is inserted between the free end of said contact arm 20 and a third stationary contact 22, said spring tending to move the arm 20 into contact with and to maintain the same bearing against one of the contacts 18 or 19, after the arm has been moved past its middle position intermediate said contacts 18 and 19. Lugs 24 are provided at the outer ends of the upper cross-head of the arm 20, said lugs 24 being adapted to co-operate with the lug 17 on the rod 11.

In the embodiment illustrated the two contacts 19 and 22 are connected in the ignition circuit of the engine, in such manner that said circuit becomes short-circuited when connection is established between said two contacts. As long as the automobile is not moving the different parts occupy the positions shown in Fig. 1. When the automobile is started and its speed increases, the shaft 1 also starts to rotate with the result that, overcoming the resistance of the spring 7, the pendulum 4 swings in the direction indicated by the arrow in Fig. 1 thus pushing the sleeve 6 to the right. Thereby the rod 11 will be moved to the left and will turn the drum 14 and move the pen point 15. The position of the contact arm 20 is not changed so long as the speed of the automobile does not exceed the permitted limit. If said limit is exceeded, however, the lug 17 strikes against the left-hand lug 24 on the arm 20 and turns said arm to the position shown in Fig. 2, so that the ignition circuit becomes short-circuited through the arm 20 and the spring 23. The engine will thus stop and can not be started again, until the arm 20 has again been moved back to the position shown in Fig. 1. This is effected automatically in the embodiment illustrated as soon as the automobile stops, by the lug 17 striking against the right-hand lug 24 on the arm 20. The described arrangement thus operates in such manner that the engine is caused to stop every time the permitted speed is exceeded, so that the driver is forced to stop the automobile and again start the engine. If the right-hand lug 24 on the arm 20 is omitted, however, the contact means must be moved back to the position shown in Fig. 1 by hand or by means of a special key, before the engine can be started again.

If it is desired to break the ignition circuit, instead of short-circuiting the same, the two contacts 18 and 22, instead of the contacts 19 and 22, should of course be connected in the ignition circuit of the engine.

In the embodiment illustrated in Fig. 3 similar reference numerals denote similar parts as in the embodiment above described with reference to Figs. 1 and 2. The shaft 1 is journalled in the bearings 2 and is driven by the flexible shaft 3, and when said shaft 1 is rotated the pendulum rod 4 pivoted to the same will swing in the direction of the arrow and, by the intermediary of the link 5 and the sleeve 6 having the groove 8 and counteracted by the spring 7, will turn the lever 10 pivoted at 9 and thus move the rod 11 to the left. The toothed rack 12 on said rod engages the toothed pinion 13 and thus turns the graduated drum 14 which indicates the speed of the automobile. The pen point 15 on the rod 11 traces a speed diagram 15$^a$ on the rotary drum 16 which is driven from one wheel of the automobile and is surrounded by a square-ruled paper. A lug 17 is also secured to the rod 11 and is adapted to actuate the contact means. As in the embodiment previously described, said means consists of a T-shaped contact arm 20 pivoted on the fulcrum 21 so as to be movable between the contacts 18 and 19. A spring 23 is inserted between the free end of said contact arm 20 and a third contact 22, said spring tending to move the arm 20 into contact with and to maintain the same bearing against one of the contacts 18 or 19, after the arm has been moved past its middle position intermediate said contacts 18 and 19. Lugs 24 are provided at the outer ends of the upper cross-head of the arm 20, and are adapted to cooperate with the lug 17 on the rod 11 in the manner above described with reference to Figs. 1 and 2. The contacts 19 and 22 are connected in the ignition circuit 38 of the engine 39 in such manner that when connection is established between said contacts 19 and 22 by the contact arm 20 and the spring 23, said ignition circuit 38 will be short-circuited, as will be readily understood from the drawing.

In this embodiment the entire contact means, that is to say, the arm 20 and the contacts 18, 19 and 22, is adjustable relatively to the lug 17 by said parts being supported on a sliding bracket 25 movable in the longitudinal direction of the rod 11 and guided in a stationary guide 26, said bracket being adapted to be moved by means of a lever 27 turning on a stationary pivot 28 and connected with the bracket by means of a link 29. An arm 30 is secured to the sliding bracket, said arm carrying at its end a drawing pin 31 adapted to trace a second diagram 31$^a$ on the paper on the rotary drum 16.

It will be obvious that by moving the bracket 25 in the guide 26 so that the contact means is adjusted into different positions relatively to the lug 17 actuating said means, it is possible to attain that the contact means will be operated and cause the engine to stop at different attained speeds. For instance, the farther the contact means is moved to the right in the drawing, the sooner will the lug 17, when moved to the left owing to the speed of the automobile being increased, strike against the left hand lug 24 on the contact arm 20 and trip the same, so that the contacts 19 and 22 become connected and the ignition circuit of the engine becomes short-circuited. Three different positions of the lever 27 are indicated in the drawing, which positions correspond to three different permitted maximum speeds, the lever being shown in the drawing set for the highest one of said speeds. When the driver arrives to a city or to a place where the permitted maximum speed is less, he will thus have to turn the lever 27 to the right to the position which corresponds to the permitted speed at such place.

The pen point 31 always indicating on the drum 16 the adjustment of the contact means it is easy afterwards to control by the aid of the diagram 31ª whether the driver has actually made adjustments in accordance with the maximum speeds permitted in different places.

In certain cases, for instance on automobiles running in cab traffic in cities, it will be suitable to connect the adjustable contact means above described with an optical signal device which indicates the maximum speed for which the contact means is adjusted. Said signal device should be so arranged that it is visible to the patrolling policemen, and it may consist of a small semaphore 33 or the like which is connected by means of a link rod 34 with the arm 35 of the lever 27, in such manner that it assumes different positions in accordance with the different adjustments of said lever. For making the signal visible at night the semaphore 33 may be provided with a number of openings 36 in which there are glass panes having different colours and which move past a lamp or lantern placed behind the semaphore.

I claim:

1. The combination with a speed indicator for automobiles and similar vehicles which are driven by means of internal combustion engines having electric ignition, said speed indicator having a movable part, of a contact means connected in the ignition circuit of the engine and adapted to be actuated by said movable part of said speed indicator in such manner that when the speed of the automobile exceeds a certain limit said means influences the ignition circuit so that the engine is caused to stop, said contact means being adjustable relatively to said movable part in such manner that when adjusted in different positions it will become actuated by said adjustable movable part at different attained speeds, a rotary drum driven in accordance with the speed of the vehicle, and a pen point connected with said contact means and adapted to trace a diagram on said rotary drum indicating the different speeds for which said contact means is adjusted.

2. The combination with a speed indicator for automobiles and similar vehicles which are driven by means of internal combustion engines having electric ignition, said speed indicator having a movable part, of a contact means connected in the ignition circuit of the engine and adapted to be actuated by said movable part of said speed indicator in such manner that when the speed of the automobile exceeds a certain limit said means influences the ignition circuit so that the engine is caused to stop, said contact means being adjustable relatively to said movable part in such manner that when adjusted in different positions it will become actuated by said movable part at different attained speeds, a rotary drum driven in accordance with the speed of the vehicle, a pen point connected with said adjustable contact means and adapted to trace a diagram on said rotary drum indicating the different speeds for which said contact means is adjusted, and an optical signal device connected with said contact means and indicating the maximum speed for which said contact means is adjusted.

AUGUST EMANUEL TILLANDER.